US012800288B2

(12) United States Patent
Angelskår et al.

(10) Patent No.: US 12,800,288 B2
(45) Date of Patent: Nov. 17, 2026

(54) OPTICAL DISPLACEMENT SENSOR ARRANGEMENT AND METHOD OF OPERATION

(71) Applicant: SensiBel AS, Oslo (NO)

(72) Inventors: Hallvard Angelskår, Oslo (NO); Hans Jørgen Bang, Oslo (NO); Endre Rørlien Bjørsvik, Nesttun (NO); Jakob Vennerød, Oslo (NO)

(73) Assignee: SensiBel AS, Oslo (NO)

( * ) Notice: Subject to any disclaimer, the term of this patent is extended or adjusted under 35 U.S.C. 154(b) by 70 days.

(21) Appl. No.: 18/956,712

(22) Filed: Nov. 22, 2024

(65) Prior Publication Data

US 2025/0172377 A1 May 29, 2025

(30) Foreign Application Priority Data

Nov. 23, 2023 (GB) ...................................... 2317915

(51) Int. Cl.
*G01B 9/02001* (2022.01)

(52) U.S. Cl.
CPC ................................ *G01B 9/02012* (2013.01)

(58) Field of Classification Search
CPC .................................................. G01B 9/02012
See application file for complete search history.

(56) References Cited

U.S. PATENT DOCUMENTS 4,652,744 A * 3/1987 Bowers .................. G01H 9/006 356/482
2009/0273770 A1 11/2009 Bauhahn et al.
2015/0369667 A1* 12/2015 Robinson .............. G01J 3/0202 356/451
2016/0282184 A1* 9/2016 Khalil ..................... G01J 3/108

FOREIGN PATENT DOCUMENTS

CN 114449968 A 5/2022
JP 2020134202 A * 8/2020 ............. G01S 17/08

OTHER PUBLICATIONS

UK Search Report Under Section 17(5); UK Intellectual Property Office; GB Patent Application No. GB2317915.3; Oct. 10, 2024; 4 pages.

* cited by examiner

*Primary Examiner* — Jamil Ahmed
(74) *Attorney, Agent, or Firm* — Taft Stettinius & Hollister LLP

(57) ABSTRACT

An optical displacement sensor arrangement including a light source, a light detector, and a reflective moveable member. The reflective moveable member is moveable relative to the light detector. The light source is disposed to direct light onto the reflective moveable member such that the light is reflected by the reflective moveable member. The light detector is arranged to detect the light reflected by the reflective moveable member, wherein the light is indicative of movement of the reflective moveable member. The optical displacement sensor arrangement is arranged to generate measurement data representing movement of the reflective moveable member based on the light detected by the light detector. The optical displacement sensor arrangement is further arranged to determine a change in a signal generated therein indicative of a rupture of the reflective moveable member; and, in response to determining said signal change, change a power level of the light source.

21 Claims, 10 Drawing Sheets

OPTICAL DISPLACEMENT SENSOR ARRANGEMENT AND METHOD OF OPERATION

CROSS REFERENCE TO RELATED APPLICATIONS

This application claims priority to United Kingdom Patent Application No. 2317915.3 filed Nov. 23, 2023, the contents of which are hereby incorporated by reference in their entirety.

FIELD

The present disclosure relates to optical displacement sensor arrangements, particularly but not exclusively optical displacement sensors that measure the displacement of a reflective moveable member such as a membrane, and their methods of operation.

BACKGROUND

Numerous types of optical displacement sensors are known in the art which may be suitable for various applications requiring measurement of the displacement of a moveable element over time. For example, optical microphones may measure the vibration of a membrane due to acoustic waves impinging thereon. Optical accelerometers may measure the motion of a flexibly suspended proof mass relative to a housing of the accelerometer.

Optical displacement sensors use light to measure displacement. Various kinds of optical readout mechanisms exist, e.g. interferometric readout. In an illustrative example of interferometric readout, an optical microphone comprises an interferometer arrangement comprising a reflective membrane surface that can move relative to a substrate surface. Laser light is directed onto the interferometer arrangement such that a portion of the light is reflected from each surface. The two portions create an interference pattern at a detector, where the interference pattern depends on the position of the membrane. The detector signal can thus be related to the position of the membrane.

Optical displacement sensors can offer reliable and sensitive readout with a high signal-to-noise ratio, especially those employing interferometric readout. Various improvements have been made in these optical displacement sensors, particularly in relation to the quality of the measurements that can be obtained.

However, there is still scope for further improvement in such optical displacement sensors, especially in relation to the practical issues involved in designing devices for widespread use.

SUMMARY OF THE INVENTION

According to a first aspect of this disclosure, there is provided an optical displacement sensor arrangement comprising:

a light source; and a light detector; and a reflective moveable member, wherein the reflective moveable member is moveable relative to the light detector;

wherein the light source is disposed to direct light onto the reflective moveable member such that the light is reflected by the reflective moveable member;

wherein the light detector is arranged to detect the light reflected by the reflective moveable member, wherein said light is indicative of movement of the reflective moveable member; and wherein the optical displacement sensor arrangement is arranged to generate measurement data representing movement of the reflective moveable member based on the light detected by the light detector;

the optical displacement sensor arrangement being further arranged to:

determine a change in a signal generated therein indicative of a rupture of the reflective moveable member; and in response to determining said signal change, change a power level of the light source.

This aspect of the disclosure extends to a method of operating an optical displacement sensor arrangement, wherein the optical displacement sensor arrangement comprises a light source; a light detector; and a reflective moveable member, wherein the reflective moveable member is moveable relative to the light detector;

the method comprising:

generating light from the light source and directing the light onto the reflective moveable member;

the reflective moveable member reflecting the light;

the light detector detecting the light reflected by the reflective moveable member, wherein said light is indicative of movement of the reflective moveable member;

generating measurement data representing movement of the reflective moveable member based on the light detected by the light detector;

determining a change in a signal indicative of a rupture of the reflective moveable member; and in response to determining said signal change, changing a power level of the light source.

The Applicant has appreciated that in optical displacement sensors in which light is reflected from a moveable member (e.g. a membrane surface), the light may inadvertently propagate in unintended directions if the moveable member is ruptured. In this context, a rupture may refer to any hole or fracture created in the moveable member or to the partial or complete removal of the moveable member. When a rupture occurs, some or all of the light from the light source may propagate through the hole or fracture into the ambient surroundings, which may be undesirable for a number of reasons.

One way of ensuring safe operation given a small risk of laser light from the light source propagating outside of the optical displacement sensor arrangement into the ambient surroundings would be to limit the power of the laser to an intrinsically safe level. However this may not be desirable in order to optimize sensitivity. Another approach would be to design a sensor housing and/or arrangement of the internal components to contain the light if a situation should arise in which the moveable member is damaged and does not reflect the light as intended. However, this may be difficult or disadvantageous to implement in e.g. because it imposes undesirable constraints on the external design and/or configuration of internal components.

In the event of a rupture of the reflective moveable member, the power of the light source (and thus the power of the light generated and emitted by the light source) may be responsively changed, e.g. lowered or turned off. This may advantageously prevent or reduce leakage of the light into the ambient surroundings of the optical displacement sensor arrangement in the event the optical displacement sensor arrangement is damaged.

The Applicant has appreciated that such an improved optical displacement sensor arrangement in accordance with the present disclosure may allow, for example, a more powerful light source (e.g. laser source) and/or more freedom in the configuration of the internal components.

It will be understood from the present disclosure that whilst the reflective moveable member may be fully reflective (e.g. transmitting only a negligible amount of light), "reflective" in this context may mean at least partially reflective.

The optical displacement sensor arrangement may comprise a closed optical sensing system, i.e. an optical system in which light from the light source is contained within the optical system during normal operation of the optical displacement sensor arrangement. The closed optical sensing system may comprise the light source, the light detector and the reflective moveable member.

In this context, normal operation means when the reflective moveable member is not ruptured. The skilled person will understand that light from the light source being contained in the optical system does not exclude the possibility of a negligible amount of light propagating out of the closed optical sensing system, e.g. arising from the reflective moveable member not being perfectly reflective.

According to a second aspect of this disclosure, there is provided an optical displacement sensor arrangement comprising a closed optical sensing system, the closed optical sensing system comprising:

a light source;

a light detector; and a reflective moveable member, wherein the reflective moveable member is moveable relative to the light detector;

wherein the light source is disposed to direct light onto the reflective moveable member such that the light is reflected by the reflective moveable member;

wherein the light detector is arranged to detect the light reflected by the reflective moveable member, wherein said light is indicative of movement of the reflective moveable member; and wherein the closed optical sensing system is arranged to generate measurement data representing movement of the reflective moveable member based on the light detected by the light detector;

the optical displacement sensor arrangement being further arranged to:

determine a change in a signal generated therein indicative of a rupture of the reflective moveable member; and in response to determining said signal change, change a power level of the light source thereby reducing or preventing leakage of the light from the closed optical sensing system.

This aspect of the disclosure extends to a method of operating an optical displacement sensor arrangement comprising a closed optical sensing system, wherein the closed optical sensing system comprises a light source; a light detector; and a reflective moveable member, wherein the reflective moveable member is moveable relative to the light detector;

the method comprising:

generating light from the light source and directing the light onto the reflective moveable member;

the reflective moveable member reflecting the light;

the light detector detecting the light reflected by the reflective moveable member, wherein said light is indicative of movement of the reflective moveable member;

generating measurement data representing movement of the reflective moveable member based on the light detected by the light detector;

determining a change in a signal indicative of a rupture of the reflective moveable member; and in response to determining said signal change, changing a power level of the light source thereby reducing or preventing leakage of the light from the closed optical sensing system.

Optional features of the first aspect of the disclosure may, where applicable, also be features of the second aspect of the disclosure.

In some examples, the light source comprises a laser (e.g. a vertical-cavity surface-emitting laser). Using a laser light source may provide benefits, e.g. providing coherent light for an optical readout method based on interferometry which can provide highly sensitive displacement measurement. However, laser safety needs to be taken into account in optical devices provided to end-users. In accordance with the present disclosure, the light source power may be lowered or turned off in the event of a rupture of the moveable member to ensure that any inadvertent exposure to the laser light cannot exceed a maximum safe exposure limit. The present disclosure may thus allow the use of a laser or a more powerful laser in an optical displacement sensor arrangement. However, the present disclosure may also provide other benefits including for other types of light sources, e.g. avoiding wasted power, identifying a fault with a sensor unit.

Changing the power level of the light source may comprise turning off the light source (e.g. reducing the power level to an amount where the light source is effectively turned off e.g. at a negligible power level).

Changing the power level of the light source may comprise reducing the power level to a reduced non-zero power level, e.g. one which is intrinsically safe. Changing the power level may comprise turning off the light source and subsequently turning it back on after a delay. The light source may be turned back on at a reduced power level and/or for a short duration after which it is turned off again. The reduced power level may be an average power level, e.g. wherein the light source is periodically or intermittently switched on and off.

In response to determining the signal change the optical displacement sensor arrangement may monitor the signal or a further signal generated in the optical displacement sensor, e.g. while the light source is operating at a reduced power level.

The further signal may be generated in any manner described herein in relation to the signal for which a change is determined, e.g. by the same detector or set of detectors, although it may be generated while the light source is operating at a lower power level. Alternatively, the further signal may be generated by a different detector or set of detectors from the original signal. The further signal may have any of the optional features of the original signal.

The optical displacement sensor arrangement may determine a further signal change that is confirmative of a rupture of the reflective moveable membrane. As outlined above, the further signal change may be a further change in the signal for which a change has already been determined or it may be a change in the further signal if applicable. The optical displacement sensor arrangement may change the power level of the light source (e.g. turning off the light source) again in response to determining the further signal change. This approach may advantageously allow testing for false positives in the detection of a ruptured moveable member.

The optical displacement sensor arrangement may monitor the signal over a first time duration (e.g. while the light source is operating at a normal power level which corresponds to normal operation of the optical displacement sensor arrangement), wherein the energy density output by the light source during the first time duration does not exceed a safe maximum permissible exposure for the light source. The step of changing the power level of the light source in response to determining the signal change may be carried out after the first time duration has elapsed, e.g. at the end of the first time duration.

The first time duration may be a short time duration to ensure that the maximum permissible exposure is not exceeded, i.e. allowing the optical displacement sensor arrangement to responsively change the power level quickly if a potential rupture is detected. However, this may mean that the analysis of the signal may be not conclusive with regard to whether there is a rupture of the moveable member, i.e. the determination of a rupture may be a false positive.

The optical displacement sensor arrangement may monitor the signal or the further signal over a second time duration (e.g. while the light source is operating at the reduced power level) wherein the energy density output by the light source during the second time duration does not exceed a maximum permissible exposure for the light source. The step of changing the power level of the light source in response to determining the further signal change may be carried out after the second time duration has elapsed, e.g. at the end of the second time duration.

The second time duration may be longer than the first time duration. For example, if the light source is operated at the reduced power level during the second time duration, this may allow the second time duration to be longer while still staying below the maximum permissible exposure for the light source. Analyzing the signal or further signal for a longer second time duration may provide a more conclusive indication as to whether there is actually a rupture of the moveable member, i.e. helping to confirm the rupture or indicating that the initial determination was a false positive. However, it is not essential for the second time duration to be longer or for the light source to be turned on at a lower power to safely check for false positives. For example, a more conclusive indication may be obtained by turning the light source on repeatedly for short time intervals (so that the average energy density is below the maximum permissible exposure) and determining the further signal change based on analyzing the signal or the further signal during the short time intervals.

The first time duration may be less than 1 ms. The second time duration may be the same as the first time duration. The second time duration may be less than 1 ms. The second time duration may be twice as long as the first time duration, or longer.

The term "maximum permissible exposure" (MPE) is well known in the field of radiation and laser safety. It may be defined as the highest power density or energy density of a light source that is considered safe, e.g. that has a negligible probability for creating biological damage. It may be defined as 10% of the dose that has a 50% chance of creating biological damage under worst-case conditions. For example, using a standard MPE calculation as known in the technical field, a laser with a wavelength of 1064 nm has an MPE average intensity of approximately 0.01 W/cm$^2$ for an exposure time of 1 s, and a UV laser of 266 nm wavelength has an MPE of 0.005 W/cm$^2$ for the same exposure time of 1 s.

Thus it can be seen that the reduced power level and/or the second time duration may be selected to give an average laser light intensity that is below the MPE but still high enough to carry out a check for false positives. It should be noted that reducing the laser power level may be beneficial even if under normal operating conditions the laser power level is sufficiently low that an MPE for the laser could not be exceeded even during continuous exposure (e.g. wherein the average laser light intensity at the reduced power level is further below the MPE than the average laser light intensity under normal operation conditions).

For example, an example average optical output of an optical displacement sensor under normal operating conditions could be on the order of 0.1 mW-0.2 mW in a small beam, wherein the MPE average intensity for the laser is 0.25 mW/cm$^2$-0.5 mW/cm$^2$. In this example, the normal operation output power corresponds to an intensity below the MPE. The reduced power level may be 50% of the power under normal operating conditions, i.e. 0.05 mW-0.1 mW, so that in the event of a potential rupture of the reflective moveable member, the average intensity of the laser is brought even further below the MPE.

The optical displacement sensor arrangement may continuously monitor the signal over a time interval (e.g. a rolling time interval) wherein the time interval has a duration that is sufficiently short to allow the optical displacement sensor arrangement to change the power level responsive to a detection of a rupture before an energy density output by the light source following the rupture reaches a maximum permitted exposure.

The signal and the further signal may be any kind of signal, e.g. representing a measured physical parameter, and may be generated by any component (e.g. detector, sensor, etc.) of the optical displacement sensor arrangement suitably configured to detect a rupture of the moveable member.

In a set of examples, an electrically conductive path (e.g. a wire or deposited metal trace) is provided on the reflective moveable member, wherein the signal change and/or the further signal change is caused by the electrically conductive path breaking. For example, the signal and/or the further signal may comprise an electrical signal that indicates a resistance of the conductive path. If the resistance of the conductive path increases, this may indicate that the conductive path has been broken by a rupture of the membrane.

In a set of examples, the optical displacement sensor arrangement comprises a pair of capacitor plates, wherein one of the capacitor plates is disposed on the reflective moveable member, and wherein the signal change and/or the further signal change is caused by a rupture of the capacitor plate on the reflective moveable member. For example, the signal and/or the further signal may comprise an electrical signal that indicates a capacitance between the capacitor plates. If the capacitance changes, this may indicate that the capacitor plate on the moveable member may have been ruptured (e.g. fractured, distorted, or partially or completely removed) by a rupture of the moveable member.

In a set of examples, the optical displacement sensor arrangement comprises an additional light detector in an interior, e.g. inside an acoustic cavity, of the optical displacement sensor arrangement. The signal and/or the further signal may comprise a detector signal from the additional light detector.

The additional light detector may be arranged to detect light entering the interior of the optical displacement sensor arrangement via a hole in the moveable member in the event that the moveable member is ruptured. The light entering the interior via the hole may be ambient light, i.e. from the surroundings of the optical displacement sensor arrangement. If the detector signal increases, this may indicate that ambient light is entering the interior of the optical displacement sensor arrangement due to a rupture of the membrane.

The optical displacement sensor arrangement may comprise an additional light source arranged to direct light onto an outward-facing side of the moveable member. In the event of a rupture, light from the additional light source may enter the interior of the optical displacement sensor arrangement via a hole in the moveable member to impinge on the additional light detector. If the detector signal increases, this may indicate that light from the additional light source is entering the interior of the optical displacement sensor arrangement due to a rupture of the membrane.

The optical displacement sensor arrangement may comprise an additional light source (e.g. a laser) arranged to direct a monitoring beam onto the reflective moveable member, such that the monitoring beam is reflected onto the additional detector. If the detector signal decreases, this may indicate that the monitoring beam is no longer being reflected onto the additional detector due to a rupture of the membrane. The monitoring beam may be a lower power beam than the light source used for optical readout both to ensure safety and because it is not required for any sensitive measurements.

The light detector may be any suitable light detector, e.g. a camera or a photo detector such as a photo diode, CCD, etc.

The optical displacement sensor arrangement may comprise a set of light detectors arranged to detect the light reflected by the reflective moveable member. The set of light detectors may consist of a single light detector or it may comprise a plurality of light detectors.

The set of light detectors may generate an optical readout signal corresponding to the light detected by the set of light detectors. The optical readout signal may comprise a set of detector signals generated respectively by one, some or all of the light detectors in the set of light detectors. The optical displacement sensor arrangement may use the optical readout signal to determine information regarding movement of the moveable member, e.g. calculating a time-varying position of the moveable member.

The optical displacement sensor arrangement may determine information regarding movement of the moveable member using optical interferometric readout. The light detector may be arranged to detect an interference pattern generated by two portions of light including the light reflected from the reflective moveable member.

The optical displacement sensor arrangement may comprise an interferometric arrangement comprising the reflective moveable member and an optical element, wherein the reflective moveable member is moveable with respect to the optical element;

wherein the light source is disposed to provide light to the interferometric arrangement such that a first portion of said light propagates via said interferometric arrangement along a first optical path in which the first light portion is reflected by the reflective moveable member, and such that a second portion of said light propagates along a second different optical path via said interferometric arrangement, thereby giving rise to an optical path difference between the first and second optical paths which depends on a distance between the reflective moveable member and the optical element; and wherein the light detector is disposed to detect at least part of an interference pattern generated by said first and second portions of light dependent on said optical path difference.

The optical displacement sensor arrangement may comprise a support structure, e.g. a substrate, having a position that is static relative to the light source and the light detector, wherein the optical element comprises a surface of the support structure and/or is disposed on a surface of the support structure. The optical element may be or comprise a reflective surface.

The interferometric arrangement may be oriented such that the first portion of light passes through the optical element before being reflected by the reflective moveable member.

The signal and/or the further signal may comprise the optical readout signal or a part thereof. The optical displacement sensor arrangement may analyze the readout signal to identify abnormal data in the optical readout signal or abnormal information derivable from the optical readout signal to determine the signal change or the further signal change.

Determining the signal change may comprise determining that a variation in the signal during a time interval (e.g. during the first time duration referred to above) is below a threshold variation value. For example, the variation in the signal may be determined by calculating a difference between a maximum value and a minimum value of the signal during the time interval. In other words, it may be determined that the signal is flat or substantially flat over the time interval. If the moveable membrane is ruptured, it may not move in response to a force that would otherwise cause it to move under normal operating conditions. For example, in an optical microphone in which the reflective moveable member is a reflective membrane, if the membrane is ruptured so that it has a hole, the pressure differential across the membrane will be substantially eliminated and the membrane will not move in response to an incoming acoustic wave. In another example, the moveable member may be completely missing, such that a near constant signal is detected which corresponds to ambient light impinging on the light detector.

Determining the further signal change may comprise determining that a variation in the signal or the further signal during a or a further time interval (e.g. during the second time duration) is below a threshold variation value. For example, the variation in the further signal may be determined by calculating a difference between a maximum value and a minimum value of the further signal during the time interval.

Determining the signal change or further signal change may comprise determining that an amplitude (e.g. a maximum or average amplitude) of the signal during a time interval (e.g. during the first or second time duration) is below a threshold amplitude value. For example, if a maximum value of the signal amplitude is very low, it may indicate that the moveable member is partially or completely missing, such that little or no light from the light source is being reflected from the reflective moveable member onto the light detector. This may also help to distinguish between a situation in which the signal is substantially flat because the moveable member simply isn't moving and, for example, a situation in which the signal is flat because the moveable member is missing and only ambient light is being detected by the light detector.

Determining the signal change or the further signal change may comprise determining that a noise contribution in the signal during a time interval (e.g. the first or second time duration) is above a threshold noise value. Any suitable analysis may be used to assess the contribution of noise, e.g. calculating the variance of the signal during the first or second time duration.

Determining the signal change or the further signal change may comprise determining that a parameter (e.g. an amplitude) of the signal has a value that is outside of a range of values that are possible for the parameter if the moveable member were not ruptured.

In a set of examples, the optical displacement sensor arrangement comprises a plurality of light detectors arranged to detect the light reflected by the reflective moveable member and to generate respective detector signals corresponding to the detected light, wherein the signal and/or the further signal comprises the detector signals. The optical displacement sensor arrangement may use one or more of the detector signals to determine information regarding movement of the reflective moveable member.

Determining the signal change and/or determining the further signal change may comprise analyzing (e.g. comparing) two or more of the detector signals. The detector signals may be analyzed over a period of time, e.g. the first or second time duration.

Analyzing the detector signals may comprise:

defining or determining an expected relationship between the two or more detector signals;

calculating a corresponding actual relationship between the two or more detector signals; and determining that the actual relationship deviates from the expected relationship by more than a threshold amount.

The expected relationship may be a relationship corresponding to normal operation of the optical displacement sensor arrangement when the moveable member is not ruptured. The expected relationship may be based on a theoretical calculation or observation of operation of the optical displacement sensor arrangement, e.g. during calibration.

The expected relationship may be a phase relationship (e.g. a phase difference) or an amplitude relationship (e.g. an amplitude difference). For example, the expected relationship for the detector signals may be that the phase difference between two of the detector signals is constant over a period of time (e.g. the first or second time duration) to within a margin. Determining the signal change or the further signal change may comprise determining that a phase difference between two of the detector signals varies by more than a threshold amount over a period of time (e.g. over the first or second time duration).

In a set of examples, the optical displacement sensor arrangement comprises a plurality of interferometric arrangements, each interferometric arrangement comprising a first optical element and a second optical element, wherein the first optical element comprises a respective portion of the reflective moveable member such that the first optical element is moveable relative to the second optical element; wherein the light source is disposed to provide light to the interferometric arrangements such that for each interferometric arrangement, a first portion of said light propagates via said interferometric arrangement along a first optical path in which the first light portion is reflected by the first optical element, and such that a second portion of said light propagates along a second different optical path via said interferometric arrangement, thereby giving rise to an optical path difference between the first and second optical paths which depends on a distance between the first optical element and the second optical element; wherein the optical displacement sensor arrangement comprises a respective light detector for each interferometric arrangement, wherein each light detector is disposed to detect at least part of an interference pattern generated by said first and second portions of light dependent on said optical path difference for the respective interferometric arrangement.

The first optical element of each interferometric arrangement may be a respective discrete optical element or a respective portion of a common optical element. For example, where the reflective moveable member comprises a reflective surface or a diffraction grating, the first optical element of each of interferometric arrangement may comprise a respective region of the reflective surface or the diffraction grating. Where the reflective moveable member comprises a plurality of reflective surfaces or diffraction grating, the first optical element of each of interferometric arrangement may comprise a respective one of the plurality of reflective surfaces or diffraction gratings.

The second optical element of each interferometric arrangement may be a respective discrete optical element or a respective portion of a common optical element. The optical displacement sensor arrangement may comprise a support structure, e.g. a substrate, having a position that is static relative to the light source and the light detector, wherein the second optical element of each interferometric arrangement comprises a surface of the support structure and/or is disposed on a surface of the support structure.

The interferometric arrangements may be oriented such that for each interferometric arrangement the first portion of light passes through the second optical element before being reflected by the first optical element.

In some examples, a respective optical path length between the first and second optical elements for light propagating from the light source to one of the light detectors is different for each interferometric arrangement. For example, each of the first optical elements or each of the second optical elements may be provided with a respective height offset, or each interferometric arrangement may be provided with a respective optical delay film to introduce a respective phase offset to the light propagating via each interferometric arrangement. The different optical path lengths provide different phase offsets, resulting in the detector signals having phase offsets relative to each other.

Determining the signal change and/or determining the further signal change may comprise determining that a phase offset between two of the detector signals deviates from an expected phase offset (e.g. as determined by calibration) by more than a threshold amount. Determining the signal change and/or determining the further signal change may comprise determining that an amplitude difference between two of the detector signals deviates from an expected amplitude difference by more than a threshold amount, e.g. at a particular calculated displacement of the moveable member or at a particular phase or amplitude of one of the detector signals.

Providing different optical path lengths for each interferometer additionally may allow the dynamic range of the microphone to be extended. Combining the detector signals to provide an optical measurement can extend the operation range of the optical displacement sensor arrangement.

Determining the signal change and/or determining the further signal change may be carried out after a pre-condition has been met.

The pre-condition may comprise any determination described herein in relation to determining the signal change and/or the further signal change. For example, the pre-condition may comprise a variation in the signal or the further signal during a time interval being below a threshold variation value. The subsequent signal change or further signal change may comprise a phase offset between two detector signals deviating from an expected phase offset by more than a threshold amount, e.g. as described above with reference to examples employing interferometric readout.

The optical displacement sensor arrangement may comprise an aperture, e.g. in the housing. The reflective moveable member may be arranged to close the aperture, e.g. to form the closed optical sensing system.

The reflective moveable member may comprise a membrane. The optical displacement sensor arrangement may comprise an optical microphone. The optical displacement sensor arrangement may comprise an acoustic port, e.g. wherein the reflective moveable member is arranged to close the acoustic port.

The optical displacement sensor arrangement may comprise an optical accelerometer. The reflective moveable member may comprise a proof mass, e.g. attached to or integrally formed with a membrane or other flexible support.

The reflective moveable member may be mounted to allow movement thereof relative to the light detector. For example, the reflective moveable member may comprise a membrane mounted in a peripheral support allowing the membrane to vibrate.

The reflective moveable member may comprise one or more optical elements. As used herein, the term optical element may refer to any kind of optical element, e.g. a reflective, refractive and/or diffractive optical element, including a surface or an interface between two materials. The or each optical element may comprise a surface of the reflective moveable member. The or each optical element may be formed in (e.g. etched in) or fabricated on (e.g. deposited on) a surface of the reflective moveable member. The reflective moveable member may comprise a diffractive optical element that is moveable relative to a static reflective surface. The static reflective surface may be fixed relative to the light detector.

The optical displacement sensor arrangement may comprise an optical displacement sensor unit comprising a housing, e.g. wherein some or all of the components of the optical displacement sensor arrangement are contained in the housing. The housing may form the closed optical sensing system, e.g. such that the housing together with the reflective moveable member fully enclose an interior of the closed optical sensing system containing the light source and the light detector.

The optical displacement sensor unit may comprise a chip with at least the light source and the reflective moveable member mounted thereon. The reflective moveable member may be manufactured using MEMS (micro-electromechanical systems) processes and may form part of a MEMS component mounted on the chip. The chip may comprise the light detector. The light detector may be remote from the chip, e.g. wherein the light reflected from the moveable member is optically coupled into the light detector by an optical connection e.g. fibre optics.

The optical displacement sensor arrangement may comprise electronics, e.g. a processor or ASIC (application-specific integrated circuit), configured to carry out one, some or all of the steps defined above (e.g. determining the signal change, determining the further signal change, changing the light source power level, etc.) The optical displacement sensor unit may comprise the electronics, e.g. the ASIC, or the electronics may be remote from the optical displacement sensor unit, e.g. a processor that receives the signals from the optical displacement sensor unit for processing.

According to a third aspect of this disclosure, there is provided an optical displacement sensor arrangement comprising:

a light source;

a light detector; and a reflective moveable member;

wherein the light source is disposed to direct light onto the reflective moveable member such that the light is reflected by the reflective moveable member; and wherein the light detector is arranged to detect light reflected by the reflective moveable member indicative of movement of the reflective moveable member;

the optical displacement sensor arrangement being arranged to:

determine a change in a signal generated therein indicative of a rupture of the reflective moveable member; and in response to determining said signal change, change a power level of the light source.

This aspect of the disclosure extends to a method of operating an optical displacement sensor arrangement, wherein the optical displacement sensor arrangement comprises a light source; a light detector; and a reflective moveable member;

the method comprising:

generating light from the light source and directing the light onto the reflective moveable member;

the reflective moveable member reflecting the light;

the light detector detecting light reflected by the reflective moveable member indicative of movement of the reflective moveable member;

determining a change in a signal indicative of a rupture of the reflective moveable member; and in response to determining said signal change, changing a power level of the light source.

Optional features of the first and/or second aspects of the disclosure may where applicable also be features of the third aspect.

It will be understood that the measurement data representing movement of the reflective moveable member may relate to intended movement of the reflective moveable member, e.g. movement responsive to a force arising from an acoustic pressure or acceleration that is to be measured. Similarly, it will be understood that detecting light reflected by the reflective moveable member indicative of movement of the reflective moveable member may refer to intended movement of the member, e.g. for performing a measurement.

BRIEF DESCRIPTION OF THE DRAWINGS

Certain preferred examples will now be described, by way of example only, with reference to the accompanying drawings, in which.

DETAILED DESCRIPTION OF THE DRAWINGS

Figure 1:
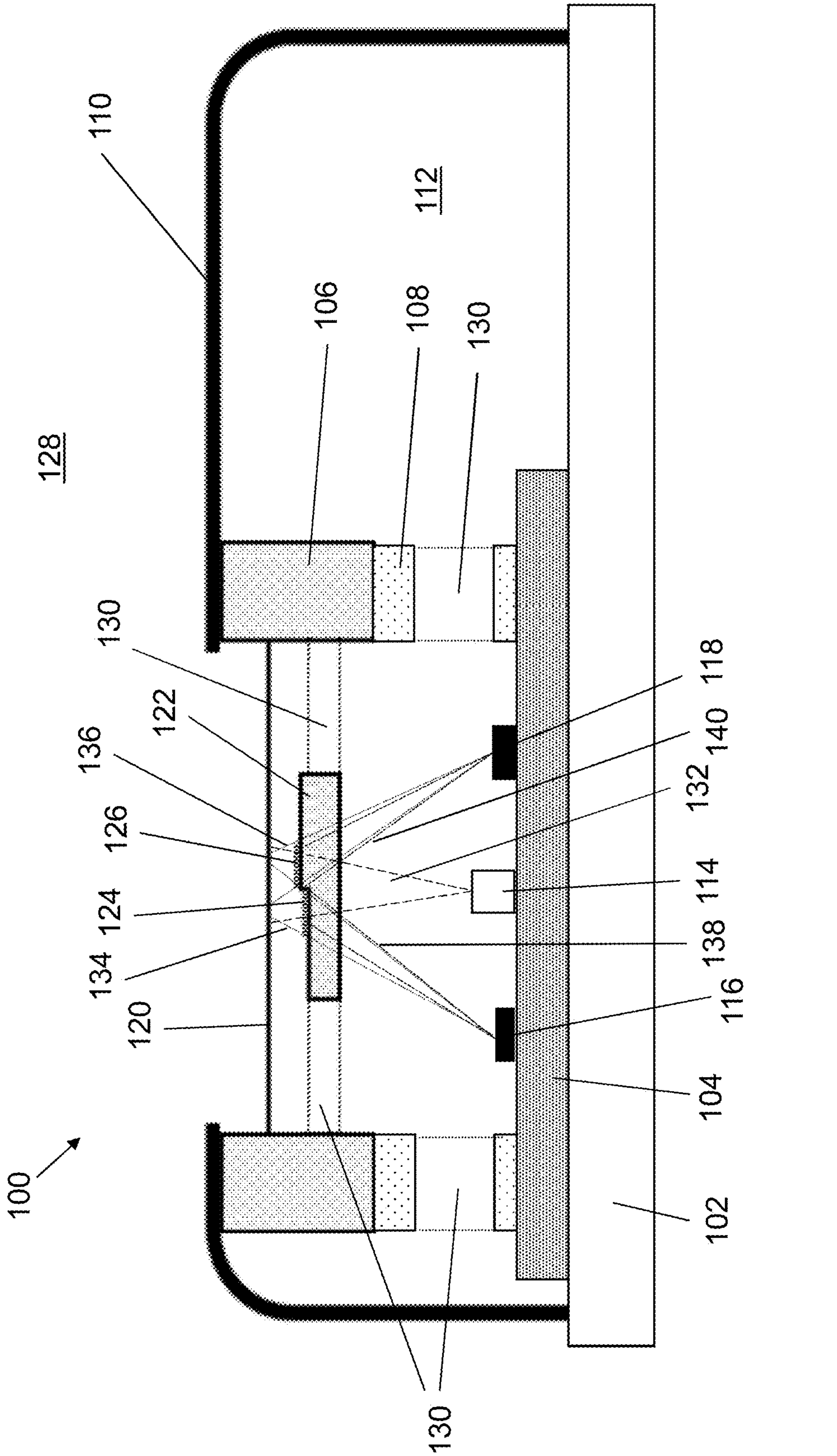
FIG. 1 shows a first example of an optical displacement sensor arrangement in accordance with the present disclosure.

The optical displacement sensor arrangement of FIG. 1 is an optical microphone 100. The optical microphone 100 comprises a base 102 with ASIC (application-specific integrated circuit) chip 104 mounted thereon, a micro-electro-mechanical systems (MEMS) component 106 mounted on the ASIC chip 104 via a spacer 108, and an enclosure 110 mounted over the base 102 to define an acoustic cavity 112.

A laser light source 114 and two photo detectors 116, 118 are mounted on the ASIC chip 104. The MEMS component 106 comprises a reflective membrane 120 and a transparent substrate 122 with two diffraction gratings 124, 126 fabricated on the substrate 122. The substrate 122 has a stepped profile, so that the diffraction gratings 124, 126 have a height offset relative to each other.

One side of the membrane 120 faces the exterior 128 of the optical microphone 100. The other side of the membrane 120 faces the substrate 122 and is in fluid communication with the acoustic cavity 112 via holes 130 in the substrate 122 and the spacer 108. When an acoustic wave impinges on the membrane 120, the membrane 120 vibrates, causing the separation between the membrane 120 and the diffraction gratings 124, 126 to vary.

During normal operation, the laser 114 directs light 132 onto the diffraction gratings 124, 126. Each diffraction grating 124, 126 together with the membrane 120 defines an interferometric arrangement. For each interferometric arrangement, a first portion 134, 136 of the light is transmitted and diffracted by the respective diffraction grating 124, 126. The first portion of light 134, 136 then impinges on the membrane 120 and is reflected back through the respective diffraction grating 124, 126. A second portion 138, 140 of the light for each interferometric arrangement is diffracted and reflected back by the respective diffraction grating 124, 126. For each interferometric arrangement, both portions of light 134, 136, 138, 140 impinge on a respective one of the detectors 116, 118, where they interfere. In this example, the first diffraction order for each diffraction grating 124, 126 is detected by the respective photo detector 116, 118. The amplitude of the light detected by each photo detector 116, 118 depends on the difference in optical path length for the first and second portions of light 134, 136, 138, 140, which depends on the separation between the membrane 120 and the respective diffraction grating 124, 126.

Each photo detector 116, 118 generates a signal which is communicated to and processed by the ASIC chip 104 to determine the membrane displacement (although the signals could be processed remotely from the optical microphone 100 instead). In accordance with the present disclosure, the signals also allow a detection as to whether the membrane 120 has ruptured as will be explained in greater detail below.

Figure 2:
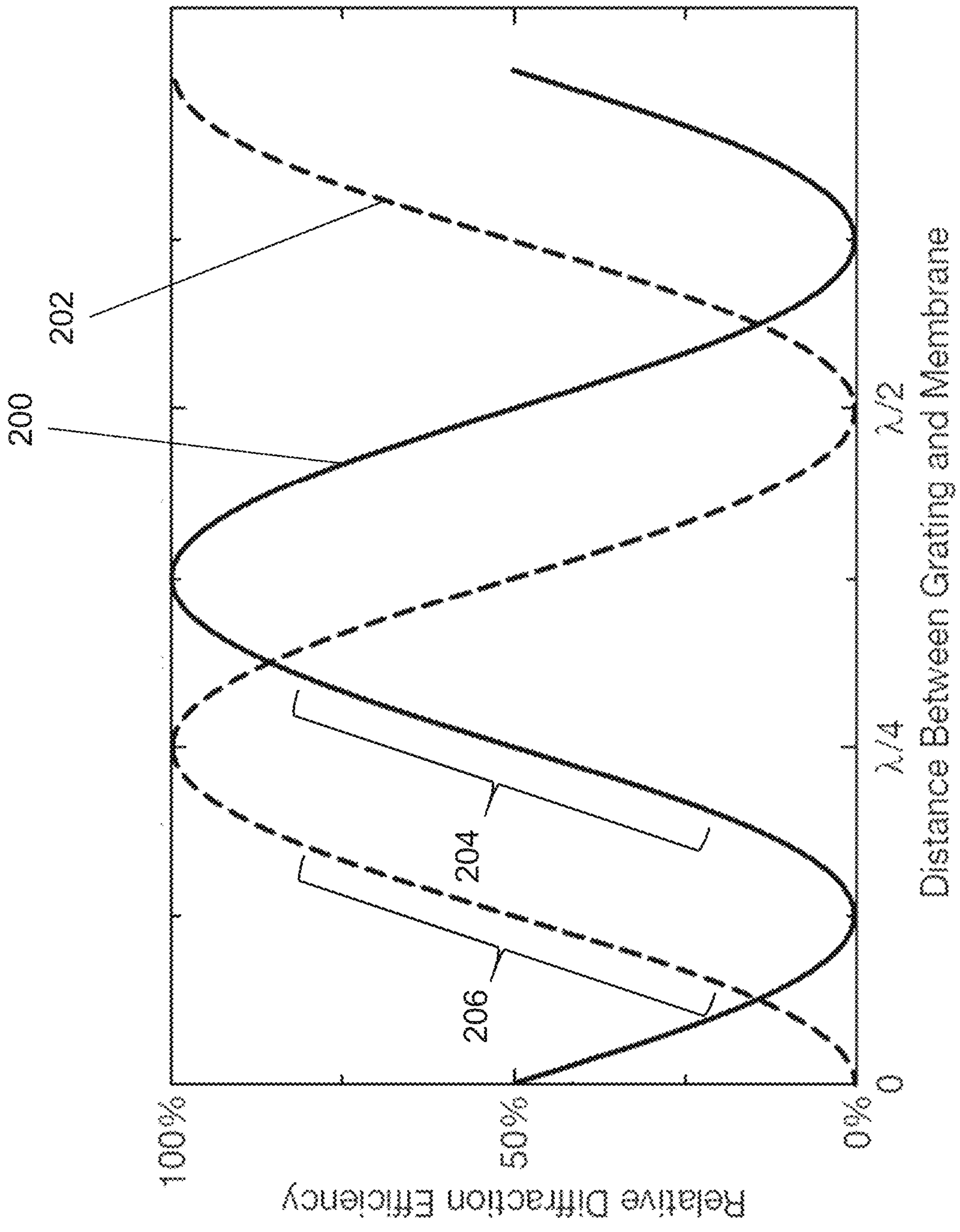
FIG. 2 shows a graph of two optical detector signals generated by the optical displacement sensor arrangement of FIG. 1.

FIG. 2 shows how the amplitude of the photo detector signals varies with membrane displacement. The amplitude is expressed as a 'relative diffraction efficiency', which indicates the proportion of light that is diffracted into the first diffraction order detected by the respective photo detector. The solid and dotted lines 200, 202 show the photo detector signal amplitudes for each of the interferometric arrangements, which vary sinusoidally as the membrane position varies.

The separation of the membrane 120 relative to the diffraction gratings 124, 126, and thus the time-varying membrane displacement, can be calculated based on the sinusoidal relationship shown in FIG. 2. The operating range of each interferometric arrangement corresponds to the substantially linear portion 204, 206 of each line 200, 202, as this is where there is greatest sensitivity in the output signal responsive to a change in membrane displacement.

The height offset of the diffraction gratings 124, 126 introduces a relative phase offset in the photo detector signals. In this example, the phase offset is 90°, but in other examples other offsets may be used. For example, three diffraction gratings may be used with three respective detectors (or sets of detectors), wherein the diffraction gratings are arranged to introduce respective phase offsets of 0°, 120° and 240° to the detector signals.

The phase offsets provide a different working point for each interferometric arrangement which extends the operating range of the optical microphone 100. The phase offsets are also used to detect a rupture of the membrane 120 in a method in accordance with the disclosure, as described with reference to FIG. 3.

Figure 3:
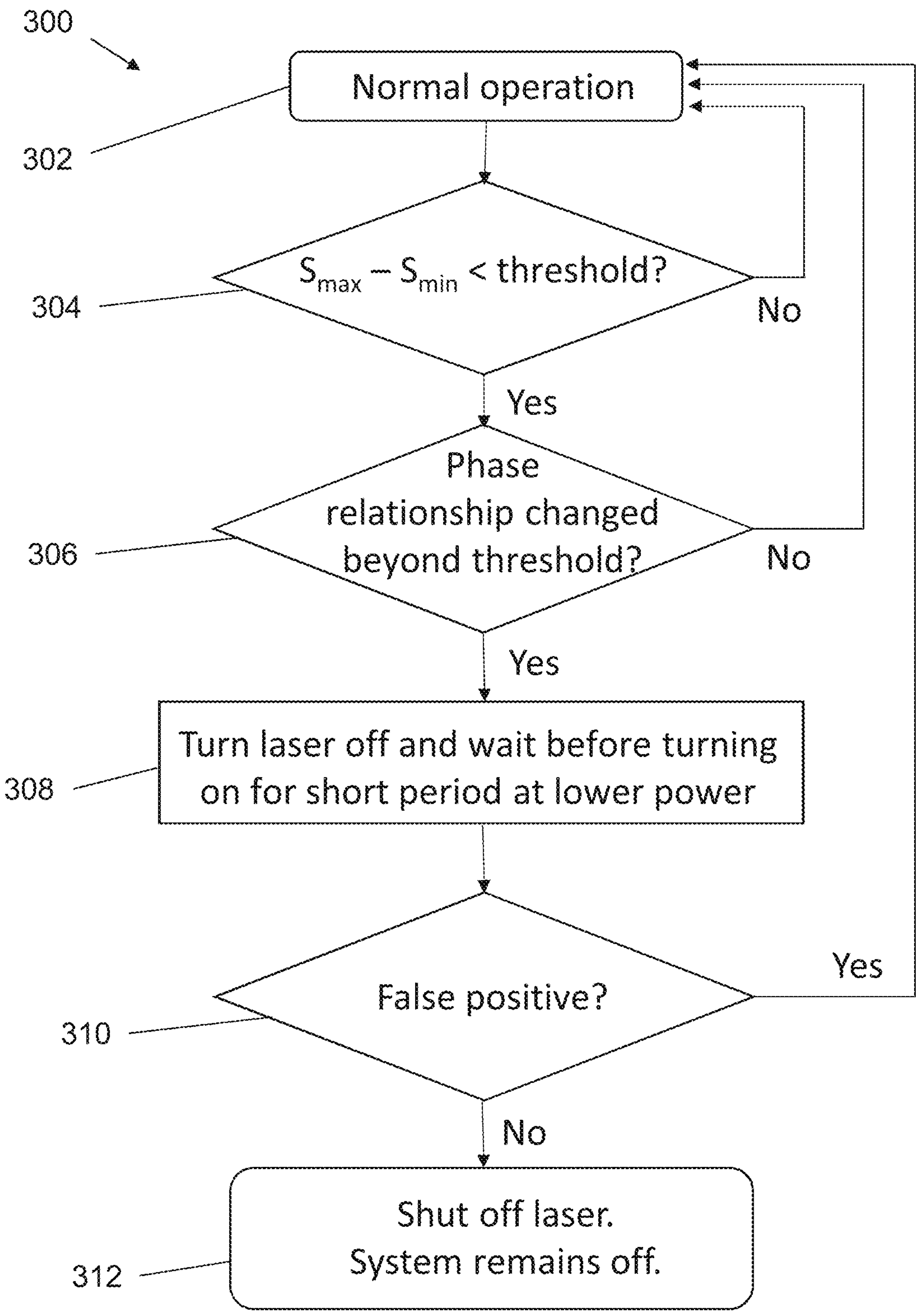
FIG. 3 shows a flowchart of a method of operation of the optical displacement sensor arrangement of FIG. 1.

FIG. 3 shows a flowchart 300 of a method of monitoring for a rupture of the membrane 120. The optical microphone 100 is initially operated under normal conditions, as indicated in box 302. While the optical microphone 100 is under normal operations, the photo detector signals are continuously monitored to detect a rupture of the membrane.

The signals are monitored over a rolling time interval Δt of 0.33 ms. The maximum signal amplitude $S_{max}$ and the minimum signal amplitude $S_{min}$ during the rolling interval period Δt are determined, as shown for two example times $t_1$ and $t_2$ for an illustrative photo detector signal 400 depicted in FIG. 4.

Figure 4:
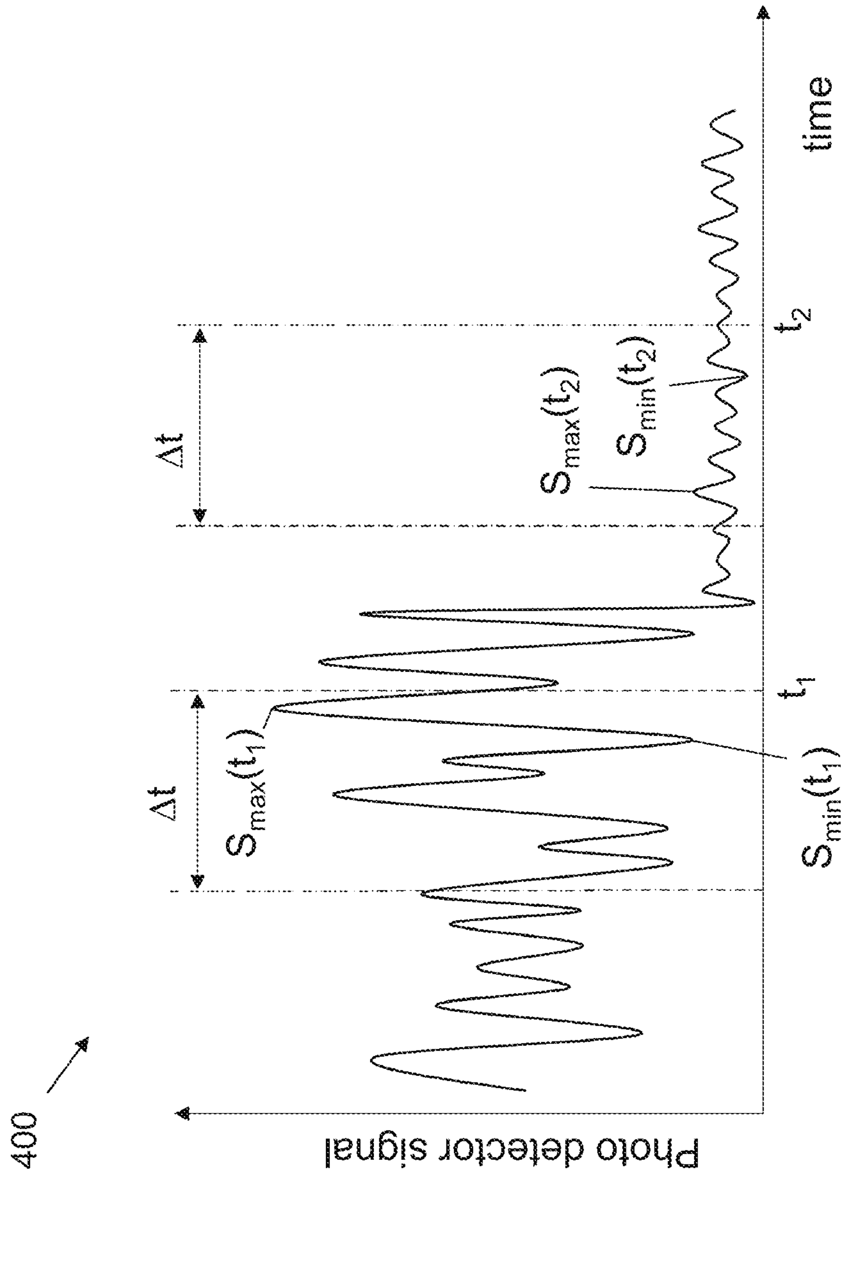
FIG. 4 shows an illustrative example of a photo detector signal generated by the optical displacement sensor arrangement of FIG. 1.

FIG. 4 illustrates the determination of $S_{max}$ and $S_{min}$ at time $t_1$ when there is significant variation in the signal 400 (corresponding to membrane movement) and at time $t_2$ when there the signal 400 is substantially flat. A substantially flat signal may indicate that the membrane 120 simply isn't moving because the microphone surroundings are quiet. However, it may also indicate that the membrane 120 has ruptured. For example, if the membrane 120 is partially or completely missing, there may be little or no light from the laser 114 that is being reflected back to the photo detectors 116, 118 by the membrane 120 and/or there may be a substantially flat signal due to constant ambient light entering the optical microphone 100 through a hole in the membrane 120.

It can be seen that during the time interval Δt immediately preceding $t_1$, there is a large difference between the values of $S_{max}$ and $S_{min}$ because there is significant variation in the signal, whereas at $t_2$, $S_{max}$ and $S_{min}$ are very close in value because the signal is substantially flat. For illustrative purposes, the variations in the photo detector signal are not shown to scale in FIG. 4 and it is to be understood that in a practical example, there may typically be many more vibrations visible in the time interval Δt.

Referring again to FIG. 3, the difference between the maximum signal amplitude $S_{max}$ and the minimum signal amplitude $S_{min}$ for the rolling time interval Δt is continuously calculated and compared with a threshold, as shown in box 304. In this example, the threshold is 50% of the maximum signal measured during calibration.

If the difference is above the threshold for both of the detector signals, this indicates movement of the membrane 120 and normal operation of the optical microphone 100 continues. If the difference is below the threshold for either or both of the detector signals, this indicates that the signal is substantially flat and that the membrane 120 may have ruptured. In that case, the method proceeds to a second test step as shown in box 306.

In the second test step, the phase relationship between the signals from the two photo detectors 124, 126 is calculated. As discussed above, in this example, the photo detector signals have a phase offset of 90° owing to the height offsets of the diffraction gratings 124, 126. The signals therefore have an expected phase relationship of a constant phase difference of 90° as the signals vary. If the signal is flat merely because the surroundings of the optical microphone 100 are quiet and the membrane 120 is not moving, this phase relationship will still be observed. However, if the membrane 120 is ruptured such that part or all of the surface that reflects the laser light 132 is missing, the detector signals do not exhibit a constant phase difference of 90°. How far the actual phase relationship deviates from the expected phase relationship typically depends on how much, if any, of the membrane 120 is still intact following a rupture. A rupture of the membrane 120 is indicated if the phase relationship changes by more than a threshold amount (e.g. determined during calibration).

If the determined phase relationship indicates that the membrane 120 is ruptured, the laser 114 is turned off, as shown in box 308. In the case of a potential membrane rupture, laser light 132 could propagate outside of the optical microphone 100. The laser 114 is therefore shut off straightaway upon detection of a potential rupture. However, there is the possibility that the detection of the membrane rupture was a false positive, so after a delay the laser 114 is turned on again at a lower power to check for a false positive, as shown in box 306. For example, the second test may be repeated. The laser 114 is only turned on again for a short time, so that even if laser light 132 is leaking out of the optical microphone 100, the duration and power level is low enough that it cannot exceed the maximum permitted exposure for the laser 114. The second test could be repeated multiple times, with the laser 114 being turned on only for a short time for each check.

If it is determined that the rupture detection was a false positive, the laser 114 is switched back on at normal power and normal operation continues. Otherwise, if it was not a false positive, the laser 114 is turned off and operation of the optical microphone 100 does not resume, as shown at box 312.

Figure 5A:
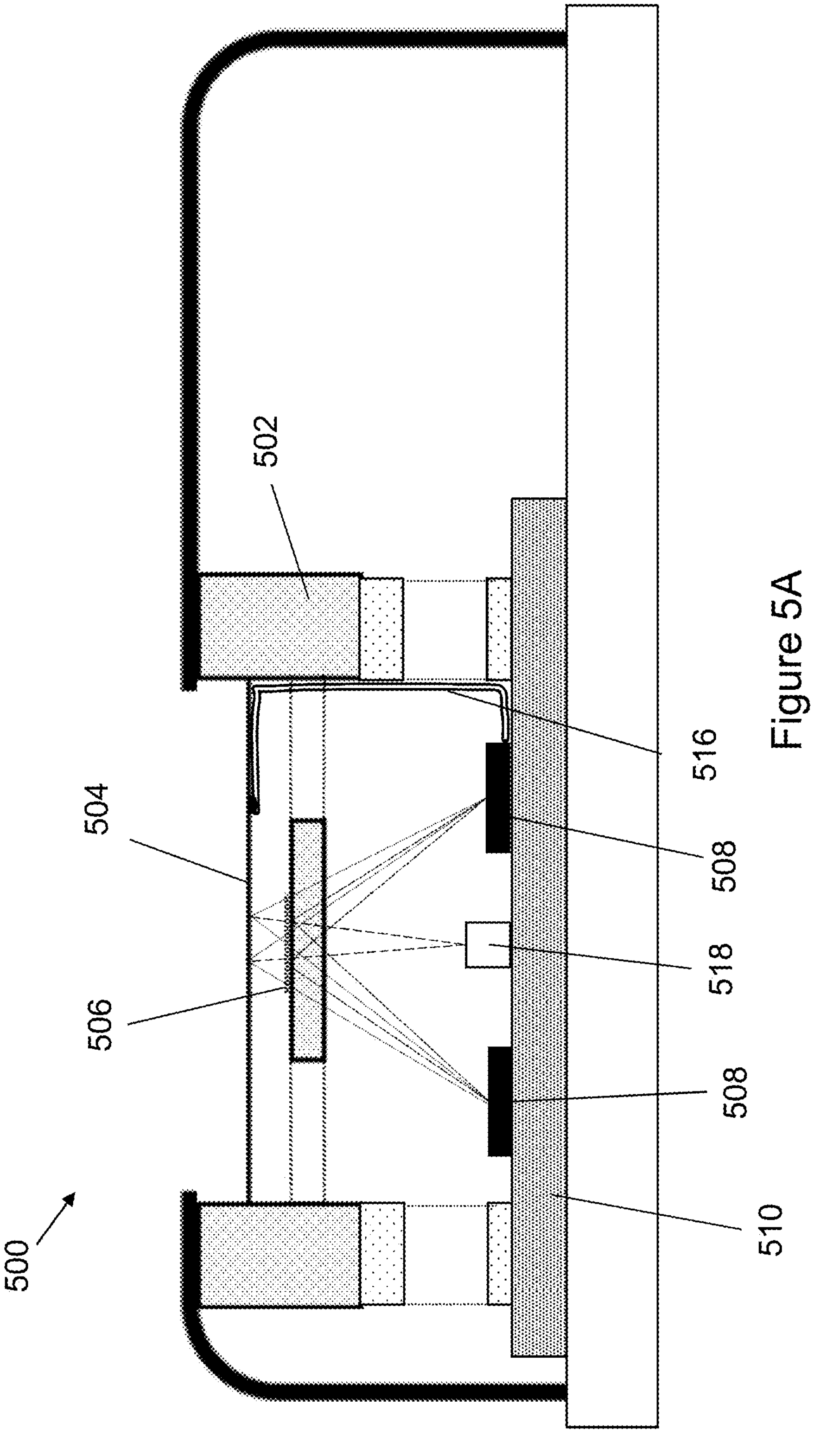
FIG. 5A shows a second example of an optical displacement sensor arrangement in accordance with the present disclosure.

FIG. 5A shows an optical microphone 500 with a different mechanism for detecting a membrane rupture. The optical microphone has the same readout features as the optical microphone 100 of FIG. 1, including a MEMS component 502 supporting a membrane 504, except that it only has one diffraction grating 506 forming an interferometric arrangement with the membrane 504, and it has two photo detectors 508 that each detect one diffraction order (the $1^{st}$ and $-1^{st}$ orders). The optical readout is carried out by an ASIC chip 510 and works on the same principles of interferometry as described above in relation to each interferometric arrangement in FIG. 1, although other types of optical readout could be used instead.

Figure 5B:
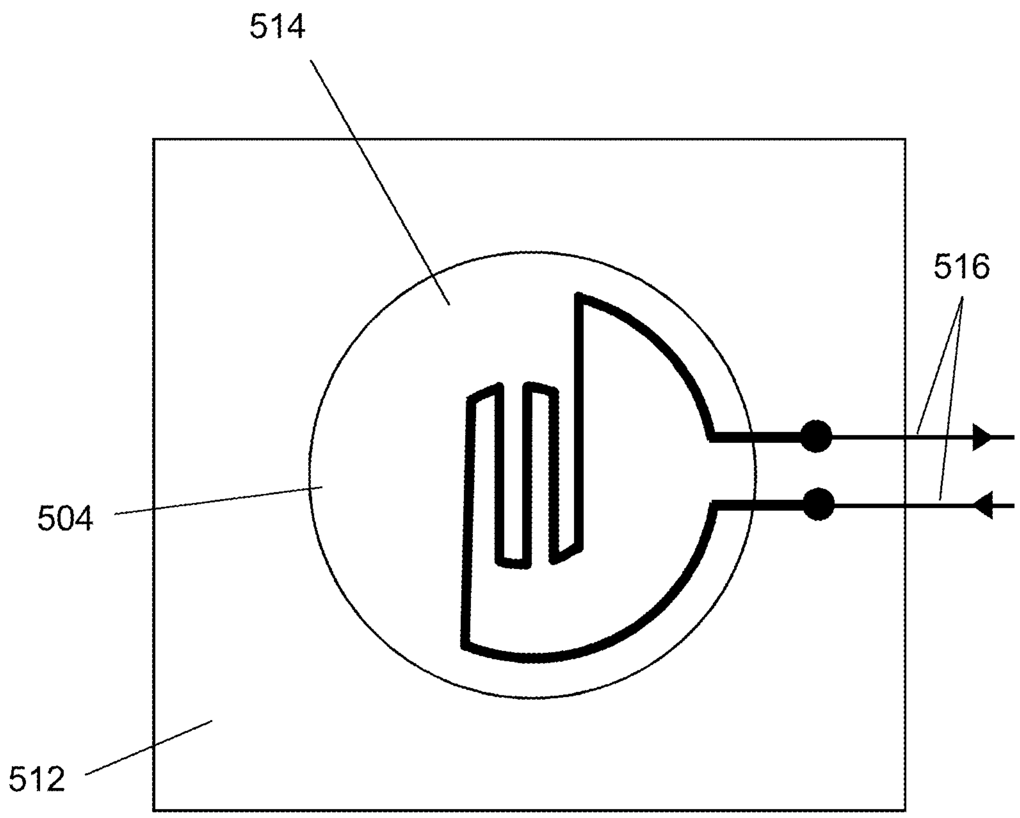
FIG. 5B shows a plan view of the membrane of the optical displacement sensor arrangement of FIG. 5A.

In this example, a rupture of the membrane 504 is identified by detecting a break in a conductive path on the membrane 504. FIG. 5B shows an example of how the conductive path may be implemented. The membrane 504 is held by a peripheral support 512, which is part of the MEMS component 502 shown in FIG. 5A. A conductive path 514 is deposited over a central region of surface of the membrane 504 using photolithography, and two wires 516 are formed by wire bonding to connect the conductive path 514 to the ASIC chip 510, as shown in FIG. 5A. A small current is used to monitor the resistance of the conductive path 514 and thus to monitor the integrity of the path 514. If the conductive path 514 is broken, this indicates that the membrane 504 is ruptured at least in the central region where the laser light impinges. When the ASIC chip 510 detects a change in the resistance of the conductive path 514, this indicates that the membrane 504 is likely to be ruptured and the ASIC chip 510 switches off the laser 518 in response.

Figure 6:
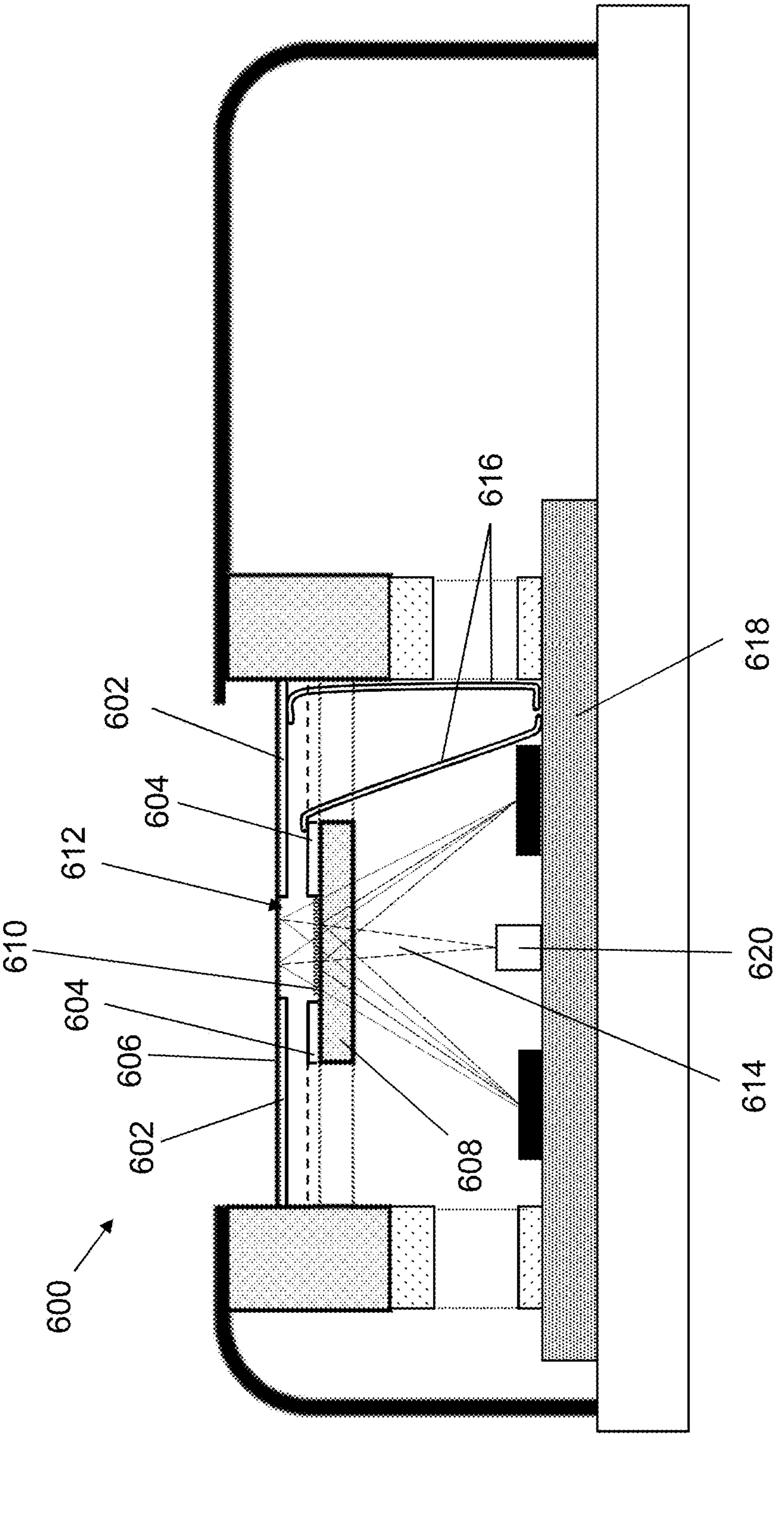
FIG. 6 shows a third example of an optical displacement sensor arrangement in accordance with the present disclosure.

FIG. 6 shows an optical microphone 600 with another different mechanism for detecting a membrane rupture. The features relating to the optical readout are the same as in the example of FIG. 5A.

In this example, a respective conductive layer 602, 604 is deposited on the membrane 606 and the substrate 608 supporting the diffraction grating 610, leaving a gap 612 in the centre of the conductive layers 602. 604 where the laser light 614 impinges. Each conductive layer 602, 604 is connected by wire bonding 616 to the ASIC chip 618, which measures the capacitance of the conductive layers 602, 604. If the membrane 606 is ruptured, removing a portion of the conductive layer 602 deposited thereon, the capacitance of the two conductive layers 602, 604 changes. If the change in capacitance exceeds a defined threshold, the ASIC chip 608 determines that the membrane 606 has ruptured and shuts off the laser 620.

Figure 7A:
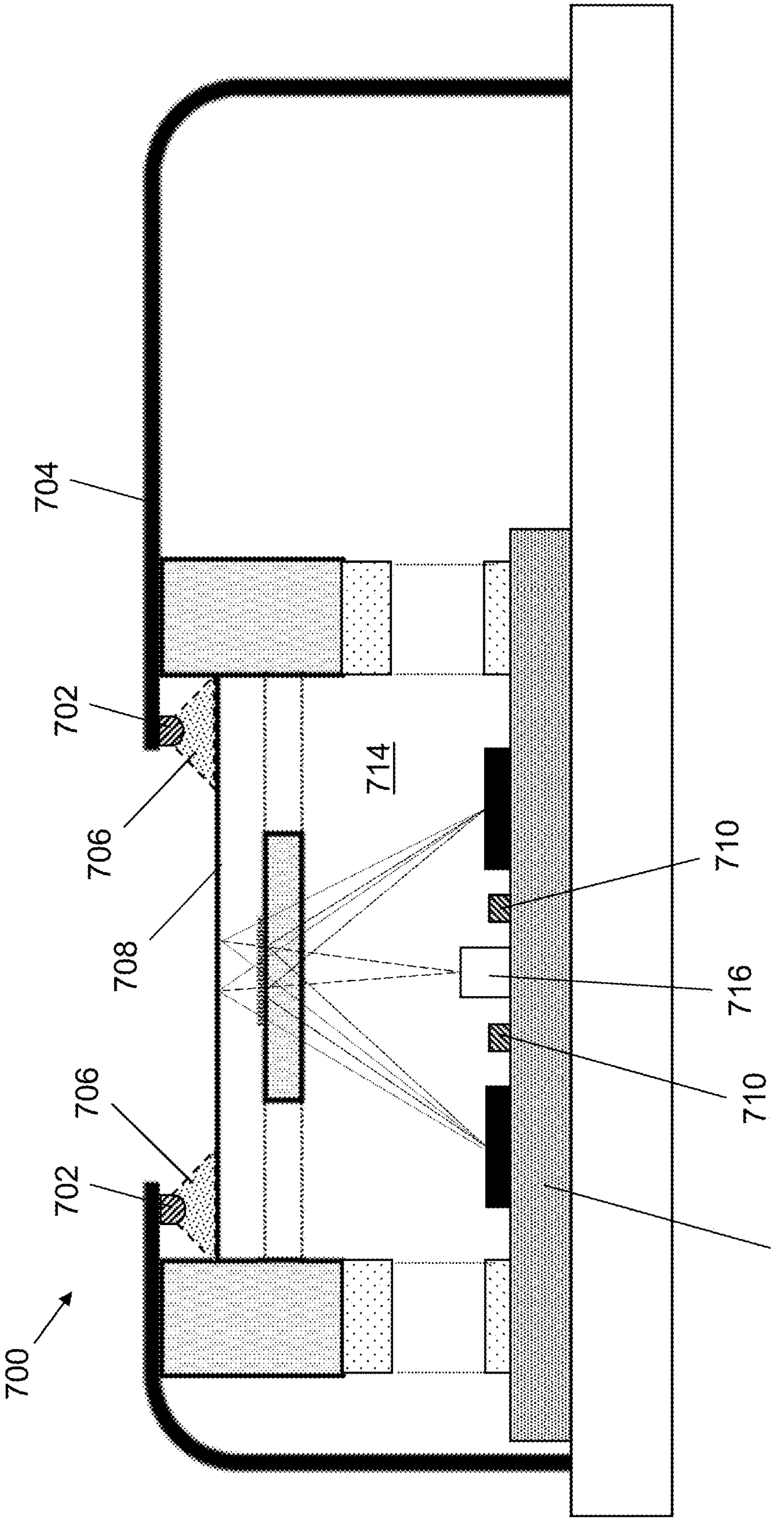
FIG. 7A shows a fourth example of an optical displacement sensor arrangement in accordance with the present disclosure.

FIG. 7A shows an optical microphone 700 with another different mechanism for detecting a membrane rupture. The features relating to the optical readout are the same as in the example of FIG. 5A.

The optical microphone 700 comprises two additional light sources 702 positioned on the enclosure 704 and arranged to direct light 706 onto the outward facing surface of the membrane 708. In this example, the additional light sources 702 are LEDs. There are also two additional photo detectors 710 inside the optical microphone 700 on the ASIC chip 712.

Figure 7B:
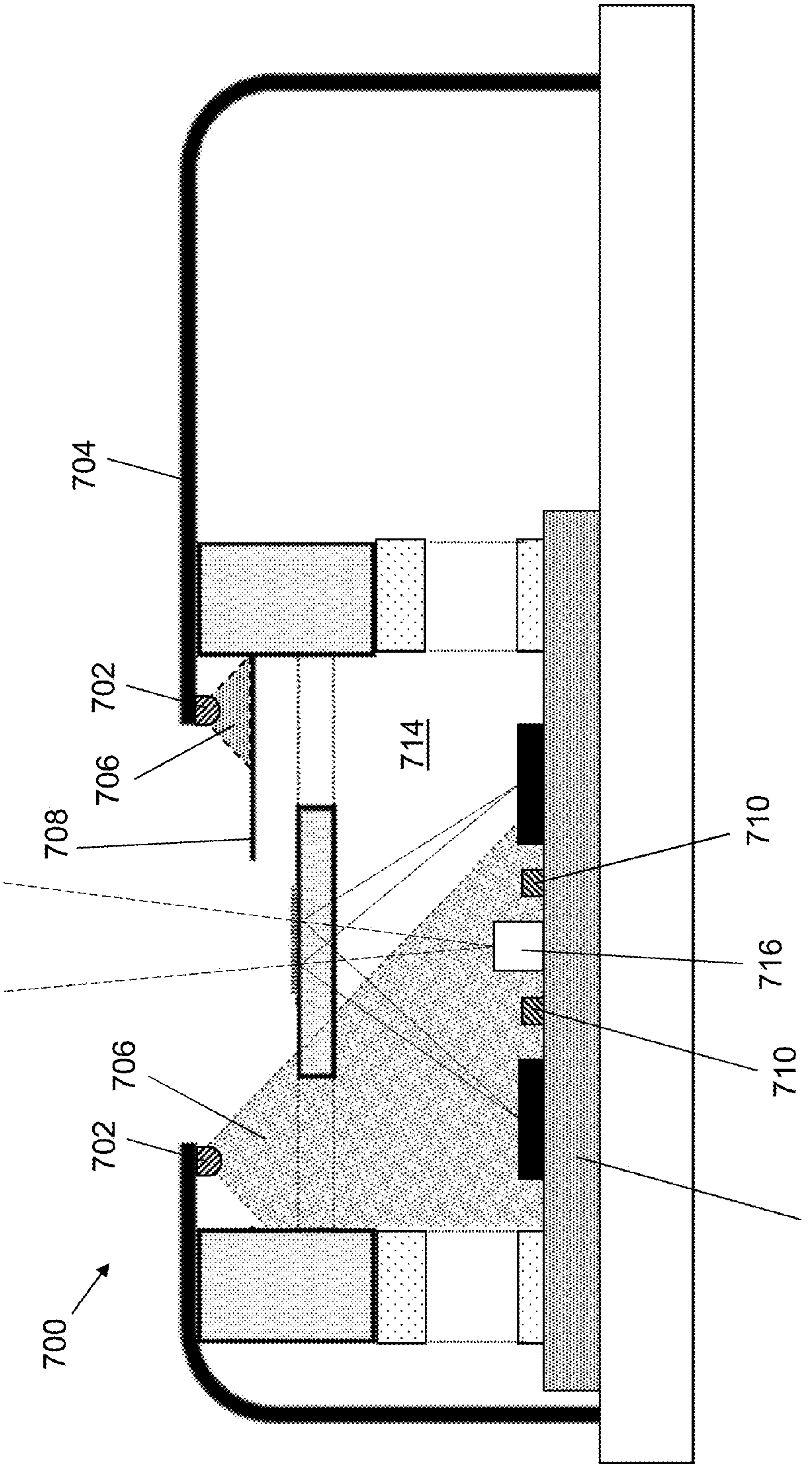
FIG. 7B shows the optical displacement sensor arrangement of FIG. 7A in the event of a membrane rupture.

When the membrane 708 is intact, the light 706 from the LEDs 702 is reflected by the outer surface of the membrane 708 and does not enter the interior 714 of the optical microphone 700. However, if the membrane 708 is ruptured, as shown in FIG. 7B, the LED light 706 propagates into the optical microphone 706 and impinges on the additional photo detectors 710. The output signal from the additional photo detectors 710 is provided to the ASIC chip 712. When the ASIC chip 712 detects a significant increase in the output signal, it determines that the LED light 706 is impinging on at least one of the additional photo detectors 710 due to a membrane rupture and shuts off the laser 716.

In a variation on this example, the additional photo detectors 170 are provided, but there are no LEDs attached to the enclosure 704. Instead, the additional photo detectors 710 detect ambient light from the optical microphone surroundings that propagates into the optical microphone interior 714 in the event that the membrane 708 is ruptured.

Figure 8:
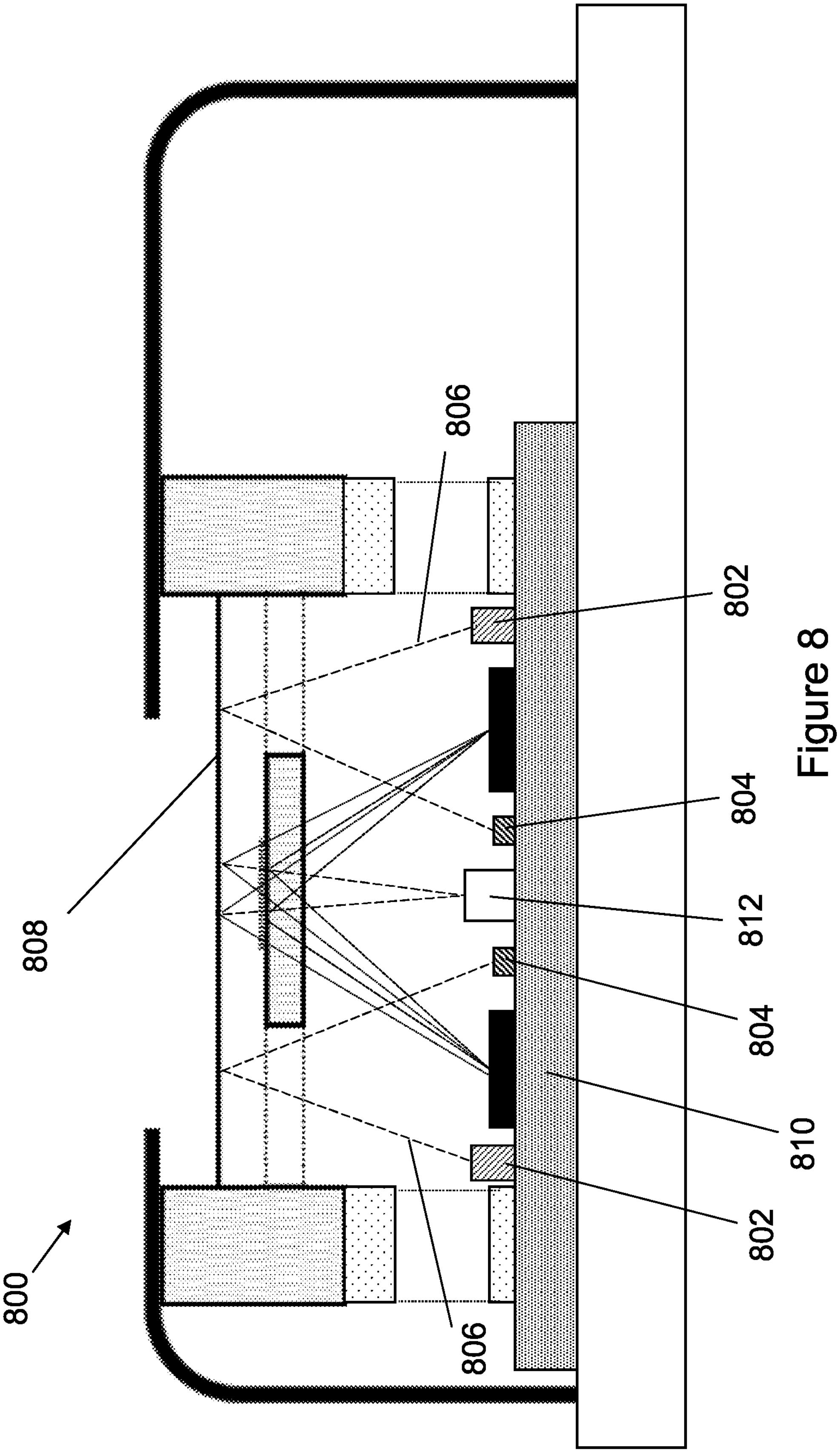
FIG. 8 shows a fifth example of an optical displacement sensor arrangement in accordance with the present disclosure.

FIG. 8 shows an optical microphone 800 with another different mechanism for detecting a membrane rupture. The features relating to the optical readout are the same as in the example of FIG. 5A.

In this example, two additional laser light sources 802 are provided, as well as two additional photo detectors 804. The additional lasers 802 each direct a low-power monitoring beam 806 onto the membrane 808. As long as the membrane 808 is intact, it reflects the monitoring beams 806 back onto the additional photo detectors 804. However, if the membrane 808 is ruptured, one or both of the monitoring beams 806 are not be reflected back onto the additional photo detectors 804. The output signal from the additional photo detectors 804 is provided to the ASIC chip 810. When the ASIC chip 810 detects a significant decrease in the output signal, it determines that at least one of the monitoring beams 806 is no longer being reflected back onto the additional photo detectors 804 due to a membrane rupture and shuts off the laser 812.

It will be appreciated by those skilled in the art that the disclosure has been illustrated by describing one or more specific aspects thereof, but is not limited to these aspects; many variations and modifications are possible within the scope of the accompanying claims.

The invention claimed is:

1. An optical displacement sensor arrangement, comprising:

a light source;

a light detector; and a reflective moveable member, wherein the reflective moveable member is moveable relative to the light detector;

wherein the light source is disposed to direct light onto the reflective moveable member such that the light is reflected by the reflective moveable member;

wherein the light detector is arranged to detect the light reflected by the reflective moveable member, wherein said light is indicative of movement of the reflective moveable member; and wherein the optical displacement sensor arrangement is arranged to generate measurement data representing movement of the reflective moveable member based on the light detected by the light detector;

the optical displacement sensor arrangement being further arranged to:

determine a change in a signal generated therein indicative of a rupture of the reflective moveable member; and in response to determining said signal change, change a power level of the light source.

2. The optical displacement sensor arrangement of claim 1, wherein changing the power level of the light source comprises turning off the light source or reducing the power level to a reduced non-zero power level.

3. The optical displacement sensor arrangement of claim 1, wherein the optical displacement sensor arrangement is arranged to determine a further signal change that is confirmative of a rupture of the reflective moveable member.

4. The optical displacement sensor arrangement of claim 1, wherein the optical displacement sensor arrangement is arranged to monitor the signal over a first time duration wherein the energy density output by the light source during the first time duration does not exceed a safe maximum permissible exposure for the light source, wherein the step of changing the power level of the light source in response to determining the signal change is carried out after the first time duration has elapsed.

5. The optical displacement sensor arrangement of claim 1, wherein the optical displacement sensor arrangement comprises an interferometric arrangement comprising the reflective moveable member and an optical element, wherein the reflective moveable member is moveable with respect to the optical element;

wherein the light source is disposed to provide light to the interferometric arrangement such that a first portion of said light propagates via said interferometric arrangement along a first optical path in which the first light portion is reflected by the reflective moveable member, and such that a second portion of said light propagates along a second different optical path via said interferometric arrangement, thereby giving rise to an optical path difference between the first and second optical paths which depends on a distance between the reflective moveable member and the optical element; and wherein the light detector is disposed to detect at least part of an interference pattern generated by said first and second portions of light dependent on said optical path difference.

6. The optical displacement sensor arrangement of claim 1, wherein determining the signal change comprises at least one of:

determining that a variation in the signal during a time interval is below a threshold variation value;

determining that an amplitude of the signal during a time interval is below a threshold amplitude value; and determining that a parameter of the signal has a value that is outside of a range of values that are possible for the parameter if the moveable member were not ruptured.

7. The optical displacement sensor arrangement of claim 1, wherein determining the signal change comprises determining that a noise contribution in the signal during a time interval is above a threshold noise value.

8. The optical displacement sensor arrangement of claim 1, comprising a plurality of light detectors arranged to detect the light reflected by the reflective moveable member and to generate respective detector signals corresponding to the detected light, wherein the signal comprises the detector signals, and wherein determining the signal change comprises analyzing two or more of the detector signals.

9. The optical displacement sensor arrangement of claim 8, wherein analyzing the detector signals comprises:

defining or determining an expected relationship between the two or more detector signals;

calculating a corresponding actual relationship between the two or more detector signals; and determining that the actual relationship deviates from the expected relationship by more than a threshold amount.

10. The optical displacement sensor arrangement of claim 9, wherein the expected relationship is a phase relationship or an amplitude relationship.

11. The optical displacement sensor arrangement of claim 1, wherein the optical displacement sensor arrangement comprises a plurality of interferometric arrangements, each interferometric arrangement comprising a first optical element and a second optical element, wherein the first optical element comprises a respective portion of the reflective moveable member such that the first optical element is moveable relative to the second optical element; wherein the light source is disposed to provide light to the interferometric arrangements such that for each interferometric arrangement, a first portion of said light propagates via said interferometric arrangement along a first optical path in which the first light portion is reflected by the first optical element, and such that a second portion of said light propagates along a second different optical path via said interferometric arrangement, thereby giving rise to an optical path difference between the first and second optical paths which depends on a distance between the first optical element and the second optical element; wherein the optical displacement sensor arrangement comprises a respective light detector for each interferometric arrangement, wherein each light detector is disposed to detect at least part of an interference pattern generated by said first and second portions of light dependent on said optical path difference for the respective interferometric arrangement.

12. The optical displacement sensor arrangement of claim 11, wherein a respective optical path length between the first and second optical elements for light propagating from the light source to one of the light detectors is different for each interferometric arrangement.

13. The optical displacement sensor arrangement of claim 8, wherein determining the signal change comprises at least one of:

determining that a phase offset between two of the detector signals deviates from an expected phase offset by more than a threshold amount; and determining that an amplitude difference between two of the detector signals deviates from an expected amplitude difference by more than a threshold amount.

14. The optical displacement sensor arrangement of claim 1, wherein the reflective moveable member comprises a membrane.

15. The optical displacement sensor arrangement of claim 1, wherein the optical displacement sensor arrangement comprises an optical microphone.

16. The optical displacement sensor arrangement of claim 1, comprising an electrically conductive path on the reflective moveable member, wherein the signal change is caused by the electrically conductive path breaking.

17. The optical displacement sensor arrangement of claim 1, wherein the optical displacement sensor arrangement comprises a pair of capacitor plates, wherein one of the capacitor plates is disposed on the reflective moveable member, and wherein the signal change is caused by a rupture of the capacitor plate on the reflective moveable member.

18. The optical displacement sensor arrangement of claim 1, wherein, the optical displacement sensor arrangement comprises an additional light detector in an interior of the optical displacement sensor arrangement, and wherein optical displacement sensor arrangement is provided with at least one of the following features:

i) the additional light detector is arranged to detect light entering the interior of the optical displacement sensor arrangement via a hole in the moveable member in the event that the moveable member is ruptured; and ii) the optical displacement sensor arrangement comprises an additional light source arranged to direct a monitoring beam onto the reflective moveable member, such that the monitoring beam is reflected onto the additional detector.

19. The optical displacement sensor arrangement of claim 1, comprising an aperture, wherein the reflective moveable member is arranged to close the aperture.

20. A method of operating an optical displacement sensor arrangement, wherein the optical displacement sensor arrangement comprises a light source; a light detector; and a reflective moveable member, wherein the reflective moveable member is moveable relative to the light detector, the method comprising:

generating light from the light source and directing the light onto the reflective moveable member;

the reflective moveable member reflecting the light;

the light detector detecting the light reflected by the reflective moveable member, wherein said light is indicative of movement of the reflective moveable member;

generating measurement data representing movement of the reflective moveable member based on the light detected by the light detector;

determining a change in a signal indicative of a rupture of the reflective moveable member; and in response to determining said signal change, changing a power level of the light source.

21. An optical displacement sensor arrangement comprising a closed optical sensing system, the closed optical sensing system comprising:

a light source;

a light detector; and a reflective moveable member, wherein the reflective moveable member is moveable relative to the light detector;

wherein the light source is disposed to direct light onto the reflective moveable member such that the light is reflected by the reflective moveable member;

wherein the light detector is arranged to detect the light reflected by the reflective moveable member, wherein said light is indicative of movement of the reflective moveable member; and wherein the closed optical sensing system is arranged to generate measurement data representing movement of the reflective moveable member based on the light detected by the light detector;

the optical displacement sensor arrangement being further arranged to:

determine a change in a signal generated therein indicative of a rupture of the reflective moveable member; and in response to determining said signal change, change a power level of the light source thereby reducing or preventing leakage of the light from the closed optical sensing system.

* * * * *